United States Patent Office 3,259,139
Patented July 5, 1966

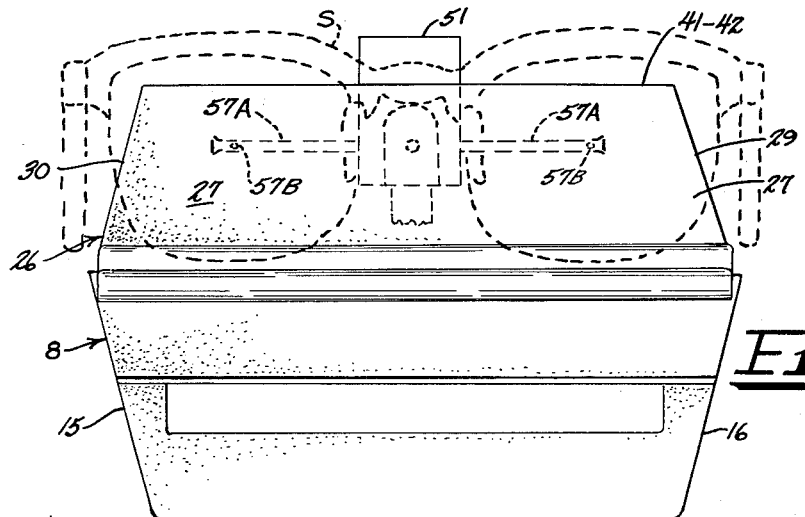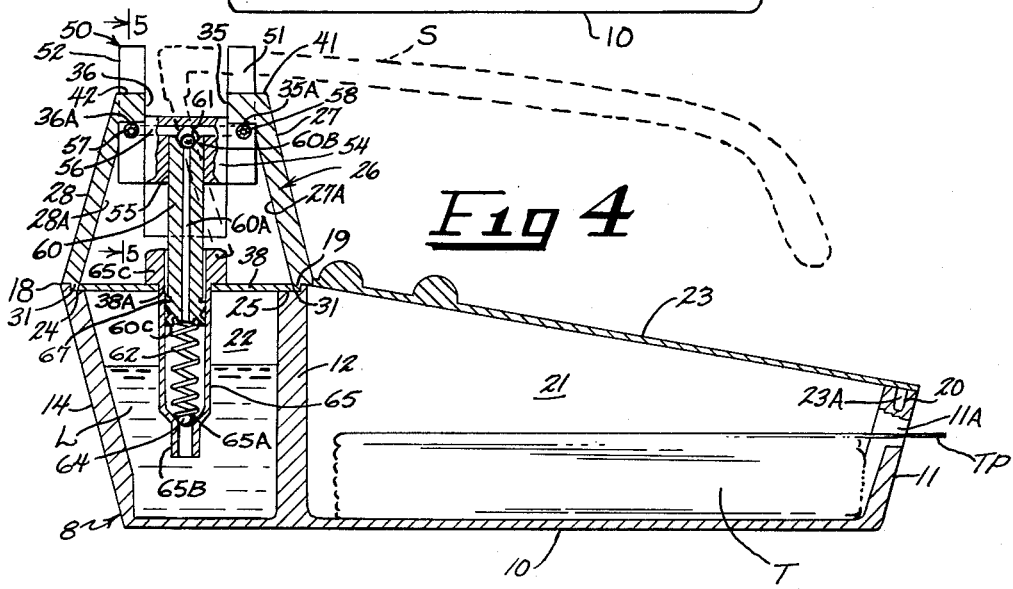

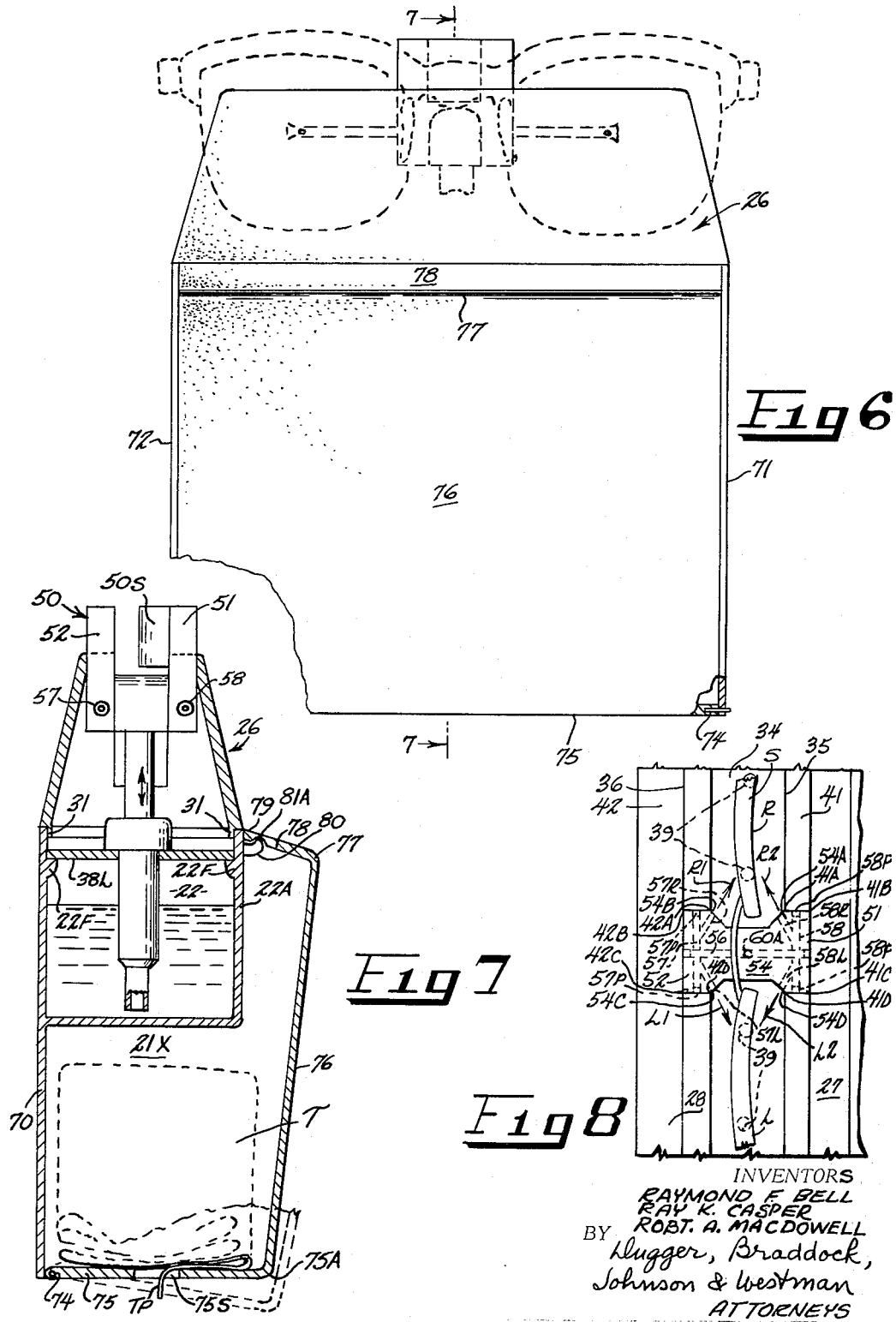

3,259,139
SPECTACLES CLEANING UNIT
Raymond F. Bell, 6909 38th Ave. N.; Ray K. Casper, 4027 Maryland Ave. N.; and Robert A. MacDowell, 6326 Humbolt Ave. S., all of Minneapolis, Minn.
Filed May 14, 1964, Ser. No. 367,319
9 Claims. (Cl. 134—47)

This invention relates to spectacles cleaning unit. For the purposes of this invention, the term "spectacles" will be considered as inclusive of eyeglasses, spectacles, goggles, lorgnettes and the like, having a frame with a nose piece supporting right and left lenses, and with or without temple pieces (bows).

Whenever spectacles are worn, they require periodic cleaning for the health and safety of the wearer. This is usually accomplished by breathing on the lenses to provide a little moisture, and then cleaning the lenses with a soft cloth, such as a handkerchief, or with a tissue. In some situations an atomizer is provided for spraying a cleaning fluid on the lenses of the spectacles and they are then wiped with tissues, or special cleaning tissues impregnated with cleaning materials are sometimes used.

It is the purpose of this invention to provide a spectacles cleaning unit which can be used in the office or in the factory or home for easily and conveniently dispensing proper amounts of cleaning fluid against the lenses of the spectacles together with a tissue dispenser for dispensing tissues for drying the lenses and completing the cleaning operation. It is a more specific object of the invention to provide an improved compact eyeglass cleaning unit having liquid and tissue dispensing devices. It is a further object of the invention to provide a spectacles cleaning unit capable of simultaneously dispensing cleaning fluid directly against both sides of the lenses of the spectacles, all conveniently and quickly. It is a further object of the invention to provide a spectacles cleaning unit which may be positioned or mounted on the horizontal surface or on a vertical surface. It is another object of the invention to provide spectacles cleaning unit suitable for use in offices and factories at worker positions adjacent machines, etc.

Other and further objects are those inherent in the invention herein illustrated, described and claimed and will be apparent at the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 1:
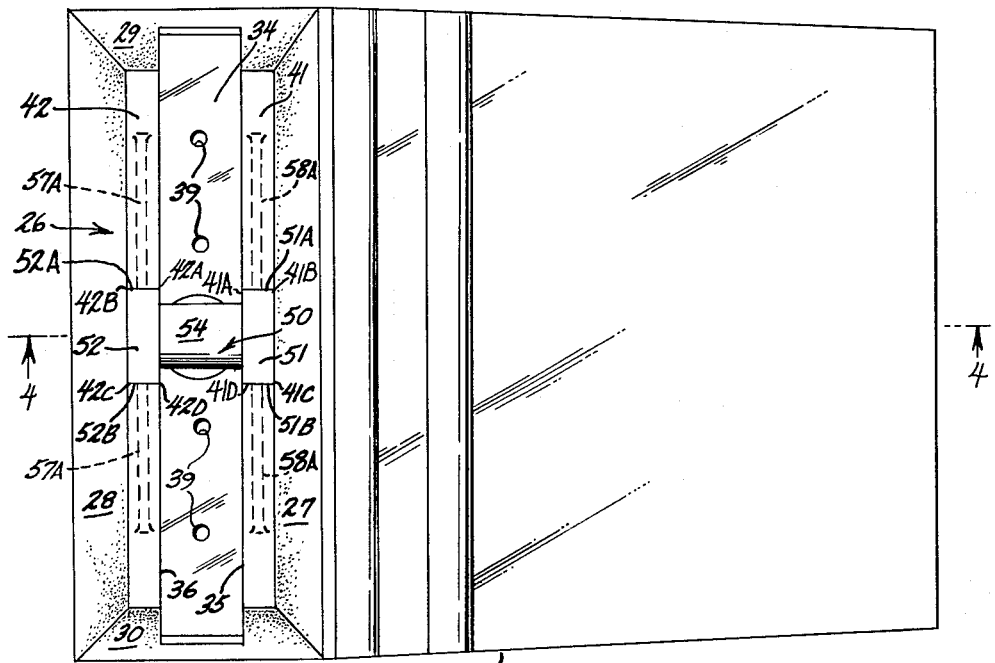
Figure 2:
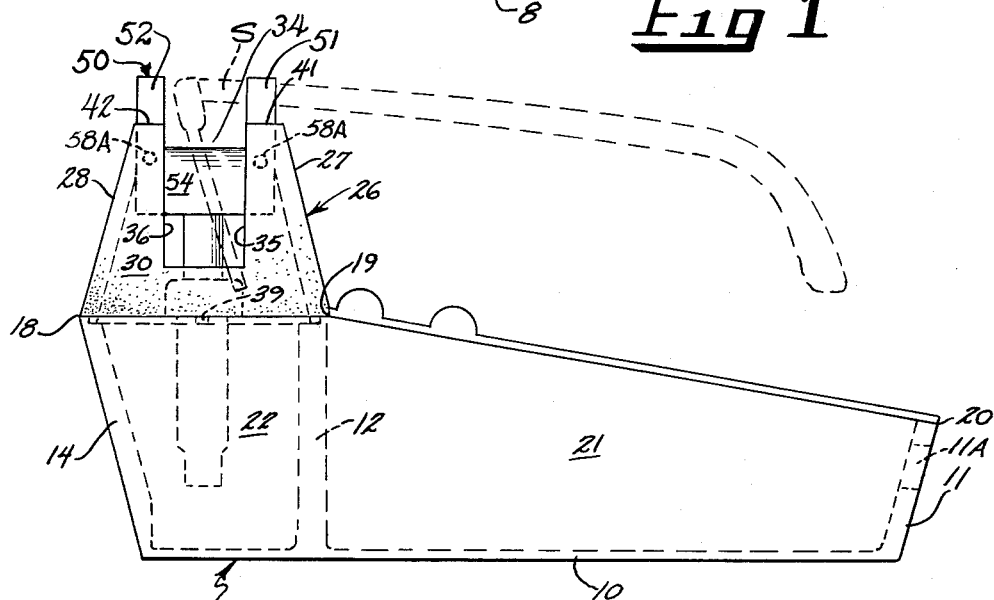

The invention is illustrated with reference to the drawings wherein:

FIGURE 1 is a plan view;
FIGURE 2 is a side elevational view;
FIGURE 3 is a front elevational view;
FIGURE 4 is a longitudinal sectional view taken along the line and in the direction of arrows 4—4 of FIGURE 1;
FIGURE 5 is a fragmentary sectional view taken along the line and in the direction of arrows 5—5 of FIGURE 4;
FIGURES 6 and 7 show another embodiment of the invention, wherein FIGURE 6 is a front elevational view and FIGURE 7 is a vertical sectional view taken along the line and in the direction of arrows 7—7 of FIGURE 6; and
FIGURE 8 is a fragmentary plan view similar to a portion of FIGURE 1, illustrating a slightly modified form of the invention.

Referring to FIGURES 1–5, the invention comprises a box-like container generally designated 8, having a bottom 10, a front wall 11, an intermediate transverse wall 12, a rear wall 14 and side walls 15 and 16. The front, rear and side walls of the container slant downwardly and inwardly, for purposes of styling. These walls may be vertical, if desired. The upper edge of the container, as viewed in side elevation, is along the line 18–19 and thence along the line 19–20. The container 10 thus is in the form of a tray which presents a front open-top tray portion 21 and a rear open-top well 22. As shown in FIGURE 4, the rear edge line 18–19 is provided with a downwardly recess seat along the surface 24–25. Upon this surface there is adapted to be positioned an upwardly tapered shell generally designated 26, of generally frustro-conical configuration having a rectangular horizontal section at the outside. Unit 26 has a front wall 27, a rear wall 28 and side walls 29 and 30. The shell is provided with a downwardly extending flange at 31—31 which is shaped so as to contact edge 18–19 and extend into and seat on the surface 24–25. The shell 26, when thus assembled onto the tray 8, in position over the well 22, will be kept from slipping sideways, once it has been positioned on the surface 18–19 with portions 31—31 extending down against the surface 24–25.

The shell 26 has a slot 34 extending fully across its width, the front wall of the slot being at 35, and the rear wall at 36. These walls extend from sidewall 29 to sidewall 30 as shown in FIGURE 1. The shell 26 is hollow and as shown in FIGURE 4, the walls 35 and 36 extend downwardly and then outwardly along the lines 35A and 36A to meet the inner walls 27A and 28A. The bottom of the shell 26 is closed by a plate 38, which can, if desired, be cemented in place and this plate is provided with a plurality of drain-hole apertures 39—39 as shown in FIGURE 1.

The walls 35 and 36 and the front and rear walls 27 and 28 do not meet, but instead provide flat upper surfaces at 41 and 42 which are in effect the top of the shell 26. These top surfaces 41 and 42 are each interrupted so as to provide rectangular openings defined by the corners 41A–41D and 42A–42D respectively. These rectangular openings are defined by vertical walls, and they serve as a vertical slot in which a saddle generally designated 50 is adapted to move up and down. The saddle 50 has two portions 51 and 52, which are vertical and of rectangular cross-section and which are of a size so that they have a sliding fit in slots 41A–41D and 42A–42D respectively, and found hence these parts of the saddle 50 slide smoothly in the slots 41A–41D and 42A–42D. These two rectangular portions 51 and 52 are attached by an integral cross bar 54 which extends from front to back and is rounded at its upper surface. The entire saddle structure 50 has a vertical borehole 55 (see FIGURE 4) in its lower surface and there is a transverse borehole 56 across through the cross bar 54. The two ends of this transverse borehole 56 are intersected by two more boreholes 57 and 58 which reach out to the vertical flat side surfaces 51A and 51B and 52A and 52B of the saddle portions 51 and 52 respectively. Then, into these boreholes 57 and 58, where they inserect these surfaces 51A–51B and 52A–52B, there are inserted small metal tubes. Thus, tubes 57A—57A are inserted into borehole 57 in the portion 52 and tubes 58A—58A are inserted into borehole 58 in the portion 51. Each of the tubes 57A—57A and 58A—58A is squeezed closed at the outer end and each is provided with a little aperture as at 58B—58B for the tubes 58A—58A, see FIGURE 5, and 57B—57B for tubes 57A—57A, see FIGURE 3. These apertures are positioned so that liquid squirted out of the aperture will hit on the approximate center of the lenses of eyeglasses positioned in the slot 34 with the nose piece of the spectacles against the crosspiece 54, see FIGURES 3 and 5.

The entire saddle structure 50 has a borehole 55 and it receives the upper end of a tube 60, see FIGURE 4. This tube 60 has a central delivery channel 60A and a conical upper surface 60B in which there is a valve ball 61. The lower end of the tube 60 is recessed at 60C to receive the upper end of a spring 62, the lower end of which seats against another valve ball 64 that in turn seats in the conical lower end 65A of the cylinder (tube) 65. Below the valve ball 64, the cylinder tube is of reduced size as at 65B. The upper end of the cylinder 65 has an enlarged flange end at 65C and the outer diameter of the cylinder is such that it neatly fits into a hole 38A in the plate 38 and it is held there by flange 65C resting on the top of the plate. The tube 60 acts as a piston, and a small piston ring such as a little O-ring at 67 is provided near its lower end. The action of the spring 62 is normally to raise the piston (tube) 60 upwardly and this raises the whole saddle structure 50 upwardly until the tubes 57A—57A and 58A—58A engage the lower surfaces 35A and 36A of the shell 26. Thus, the tubes 57A and 58A in cooperation with the surfaces 35A–36A limit the upward travel of the piston tube 60 in response to the upward pressure of the spring 62. However, when the saddle 50 is depressed, the piston 60 will compress the liquid contained within the cylinder tube 65. The ball check valve 64 thereupon closes, and the liquid is then forced upward through the channel 60A of the piston 60 and out under the valve ball 61 and thence through the cross channel 56 and out through the boreholes 57 and 58 in saddle 50 and thence out through tubes 57A—57A and 58A—58A and is squirted out through the orifices 57B—57B and 58B—58B and the cleaning fluid is simultaneously deposited against the front and back surfaces of the lenses of spectacles positioned in the slot 34 with the nose piece bridging portion 54 of the saddle.

Thus, by placing a pair of spectacles S in position in the slot 34, as shown in FIGURES 2–5, and by pressing down on the upper surfaces of portions 51 and 52 of the saddle 50, small squirts of cleaning fluid will be simultaneously ejected from the four apertures and delivered against the front and rear surfaces of the right and left lenses of the spectacles. Any excess cleaning fluid drains down from the lenses and onto the upper surface of the plate 38 and thence through the drain holes 39 and back into the reservoir space 32. The cleaning liquid L is contained in the reservoir space 22 at a level such as illustrated in FIGURE 4.

The front space 21 of the container is provided with a cover 23, which may have integral pins 23A or flanges (not shown) on it to prevent the cover from sliding off. In the front wall 11 there is provided an aperture 11A, see FIGURES 2, 3 and 4, and within the space 21 there is provided a stack of tissues T with the leaves of the tissue inter-folded. If the topmost leaf of tissue is permitted to protrude as at TP, see FIGURE 4, the tissue may be conveniently withdrawn a sheet at a time through the slot 11A.

Therefore, for cleaning the spectacles, it is only necessary to take them off, place them in the slot 34 with the nose piece of the spectacles on the crosspiece 54, then the whole saddle structure 50 is depressed by pressing on the upper surfaces of the portions 51 and 52 and this causes the entire saddle and pump structure to be depressed and the spectacles also ride down with the saddle 50. This causes the cleaning fluid to be ejected onto the lenses. The spectacles are then removed and dried with cleaning tissue which is conveniently withdrawn from the slot 11A.

Referring now to FIGURES 6 and 7 there is illustrated another embodiment of the invention which is especially adapted for wall mounting. In this form of the invention, the structure is rearranged so that the liquid reservoir space 22 is made the upper part of a container with a common wall with the lower part 21X of the container. The lower part 21X is defined by a rear wall 70 and side walls 71 and 72. At the lower rear portion of the side walls, there are provided the hinge pins 74 on which the lower rear edge of the unitary bottom wall-front wall 75–76 is hinged. The bottom 75 extends outwardly to the corner 75A and thence upwardly along the front 76 and thence around the corner 77 and rearwardly along the portion 78 to the edge 79, which closes against the front wall 22A of the liquid container. The small protuberance 80 on wall 22A of the liquid reservoir cooperates with a groove 81 to act as a detent to hold the bottom-front wall 75–76 closed. The wall portions 75–76–77–78 being sufficiently flexible to snap over protuberance 80 to keep the device closed, but still permit opening.

To fill the space 21X the entire bottom-front cover 75–76 is swung outwardly to disengage 80–81 and then downward about the pivot 74, and a stack of tissue T may then be inserted with the lowermost tissue protruding at TP, see FIGURE 7. The bottom 75 is provided with a slot at 75S and the tissue may therefore be withdrawn one piece at a time, as desired. Insofar as the structure 26–50 and the pump structure are concerned, these are precisely the same as illustrated with reference to FIGURES 1–5, except that the plate 38 is positioned a little lower, to the position 38L where it rests upon an inner flange 22F in the liquid reservoir 22. The shell 26, however, is still shaped so that it has the portion 31 which enters the upper wall edges of the liquid container space 22 and thus locates and is held in such position.

In FIGURE 7, there is also illustrated a sponge block 50S which may, if desired, be fastened against portion 51 of the saddle 50 for assisting in holding the spectacles in position while the saddle 50 and the spectacles 50 are pushed down for ejecting the cleaning liquid against the spectacles. In all other respects, the construction shown in FIGURES 6 and 7 is the same as that shown and previously described.

In FIGURE 8 there is illustrated a slightly modified form of the invention, which is identical to the spectacle pump and spray portions of the embodiments shown in FIGURES 1–5 and FIGURES 6–7 except that the delivery tubes 57A–57B and 58A–58B are eliminated and the delivery passages and orifices are made a part of the saddle 50. To do this, the cross-bar 54 and slide portions 51 and 52 are made as before except that angularly disposed faces 54A, 54B, 54C and 54D are provided where the cross-bar 54 joins the slide portions 51 and 52. Then the channel 56 through cross-bar 54 is provided, as before, to connect at its center to the pump outlet channel 60A and the ends of channel 56 connect, as before, to the channels 57 and 58 which are respectively, in slide portions 52 and 51. However, in this instance, the ends of channel 57 are plugged as at 57P and the ends of channel 58 are plugged at 58P. Then, to provide outlets, side channels are provided at 57R and 57L, connecting to channel 57, lead out to discharge ports in angularly disposed faces 54B and 54C respectively, and similar side channels 58R and 58L connecting to channel 58, lead out to discharge ports in angularly disposed faces 54A and 54D respectively. The channels 57R–57L and 58R–58L are so spaced and directed that the cleaning fluid will be simultaneously squirted out, in the direction of arrows R1–R2 and L1–L2 against proximate areas of the front and back faces of the spectacle lenses R and L of the spectacles. In this way, it is possible to save the cost of tubes 57A–57B and 58A–58B of the embodiments shown in FIGURES 1–7 and still obtain sufficient distribution of cleaning fluid.

As many widely apparently different embodiments of this invention may be made without departing from the spirit and scope thereof, it is to be understood that we do not limit ourselves to the specific embodiments disclosed herein.

What is claimed is:

1. A device for applying cleaning fluid to spectacles having a nose piece and right and left lenses mounted thereon comprising a frame having a slot therein for supporting the spectacles with the lenses generally vertical, a transverse wall across said slot for locating the nose piece of spectacles and the lenses in the slot, pump means mounted on the frame, and manually movable means connected to the pump means for actuating it, a reservoir, a suction inlet tube on the pump means extending into said reservoir, and delivery channels connected to the outlet of the pump means, said channels terminating in orifices for delivering fluid simultaneously to at least one corresponding face of each lens of the spectacles.

2. The device of claim 1 further characterized in that said channels are in said transverse wall.

3. The device of claim 1 further characterized in that said channels are provided with orifices for delivering fluid simultaneously to the front and back faces of the right and left lenses of the spectacles.

4. The device of claim 1 further characterized in that said transverse wall is made movable relative to the frame and is connected to the pump for operating it.

5. The device of claim 4 further characterized in that the delivery channels are in the transverse wall and fluid is delivered from the pump means through said channels in said transverse wall to said orifices.

6. A cleaning unit for spectacles comprising a pump including cooperating cylinder and piston, members arranged generally upright and movable relative to each other, inlet and outlet passages for said pump, the outlet being through one of said pump members, said outlet having spaced parallel delivery channels having nozzles therein directed toward each other, support means on said pump member having the outlet passage for supporting spectacles proximate to the nozzles for receiving on the lenses of the spectacles fluid ejected from said nozzles, and a reservoir connected to the other pump members for delivering fluid in the reservoir to said pump member and for supporting said member.

7. The unit of claim 6 further characterized in that a housing shell is mounted on said reservoir, said support means being mounted for up and down reciprocating movement in said shell, said shell being slotted to receive the spectacle lenses therein when said spectacles are positioned on said support member.

8. The unit of claim 6 further characterized in that said delivery channels are in said support means.

9. The unit of claim 6 further characterized in that said delivery channels are spaced parallel tubes mounted on and projecting from the support means and defining a space between them for receiving the spectacle lenses when the spectacles are placed on the support means.

References Cited by the Examiner

UNITED STATES PATENTS

| | | | |
|---|---|---|---|
| 118,898 | 9/1871 | Batchelder | 220—22 |
| 417,257 | 12/1889 | Levitas | 134—156 X |
| 638,126 | 11/1899 | Kampfe et al. | 220—22 |
| 2,067,780 | 1/1937 | Morrison | 134—47 |
| 2,789,725 | 4/1957 | Carper | 221—96 X |
| 3,008,161 | 11/1961 | Jensen | 15—21 |
| 3,092,120 | 6/1963 | Hilger et al. | 134—47 |
| 3,113,579 | 12/1963 | Willis | 134—145 |

FOREIGN PATENTS 552,209   4/1923   France.

CHARLES A. WILLMUTH, *Primary Examiner.*

ROBERT L. BLEUTGE, *Assistant Examiner.*